United States Patent [19]

Kato

[11] 3,743,365
[45] July 3, 1973

[54] ROTARY SHAFT SUPPORTING DEVICE
[75] Inventor: Shogo Kato, Toyota, Japan
[73] Assignee: Toyota Jidosha Kogyo Kabushiki Kaisha, Toyota, Japan
[22] Filed: Aug. 2, 1971
[21] Appl. No.: 168,108

[30] Foreign Application Priority Data
Aug. 4, 1970 Japan.................. 45/68137

[52] U.S. Cl. .................... 308/26, 308/184
[51] Int. Cl. .......................... F16c 35/04
[58] Field of Search .............. 308/26, 184 R

[56] References Cited
UNITED STATES PATENTS
2,494,815  1/1950  Jadoul ............... 308/26
2,933,354  4/1960  Primeau ........... 308/184 R
3,140,901  7/1964  Young ............... 308/26
2,012,997  9/1935  Junkers ............. 308/26

FOREIGN PATENTS OR APPLICATIONS
921,720   3/1963  Great Britain ..... 308/26
1,341,341 9/1963  France ............... 308/26

Primary Examiner—Charles J. Myhre
Assistant Examiner—Barry Grossman
Attorney—Stevens, Davis, Miller & Mosher

[57] ABSTRACT

A rotary shaft supporting device comprising an annular housing, a plurality of resilient support members each arranged as a chord of one of the arcs obtained by equally dividing said annular housing, a resilient annular member disposed to contact at its outer circumferential surface the geometrical centers of said resilient support members, and a rotary shaft supporting bearing mounted on the inner circumferential surface of said resilient annular member.

7 Claims, 4 Drawing Figures

3,743,365

ROTARY SHAFT SUPPORTING DEVICE

This invention relates to a supporting device for a rotary shaft, such as a propeller shaft of motor vehicles, for example, which is provided at the center bearing portion of such shaft.

In one type of rotary shaft supporting device known in the art, a cylindrical member of large diameter and thickness is formed from a rubber or other resilient material, and a bearing is mounted in such cylindrical member by force fitting, so that the cylindrical member serves as a supporting device for the rotary shaft.

The supporting device of the type described above may be effective to absorb and attenuate axially directed shocks and radially directed vibrations. However, such supporting device permits little or no movement of the bearing axially and radially of the rotary shaft journalled thereby. Accordingly, forces of excessively great magnitude will be exerted on the supporting device as a whole, thereby making it impossible for the supporting device to satisfactorily absorb and attenuate the aforementioned shocks and vibrations. Besides, when such supporting device is placed in service over a prolonged period of time, it will have deleterious effects on the rotary shaft or bearing.

An object of this invention is to provide a rotary shaft supporting device, simple in construction and low in cost, which permits positive and rapid absorbtion and attenuation, when a running motor vehicle stops suddenly, of axially directed shocks which its propeller shaft rotating at high speed suffers, or radially directed vibrations to which the shaft is subjected.

Another object of the invention is to provide a rotary shaft supporting device in which a bearing supporting a rotary shaft is supported by a resilient annular member mounted on the outer peripheral surface of the bearing, and said annular member is supported by a plurality of resilient support members disposed in an annular housing, whereby eccentric movement or radial displacement of the bearing portion can be allowed, and particularly axial displacement of the rotary shaft can be allowed to a large extent.

Another object of the invention is to provide a rotary shaft supporting device in which a resilient annular member mounted on the outer peripheral surface of a bearing is formed integrally with reinforced portions projecting radially outwardly in face-to-face relationship with an annular housing to thereby control radial displacement of the rotary shaft.

Still another object of the invention is to provide a rotary shaft supporting device in which each of said plurality of resilient support members is formed in wave form with the ridges of waves being directed axially of the bearing so as to resiliently support the bearing, the ridges of waves in two equal parts of each support member divided by the geometrical center of the supporting member being asymmetrically arranged when the bearing becomes eccentric or is displaced axially, the tensile forces exerted on the support members cancelling one another so that the rotary shaft supporting device may have uniform flexible rigidity.

Additional objects as well as other features and advantages of this invention will become evident from the description set forth hereinafter when considered in conjunction with the accompanying drawings, in which.

Figure 1:
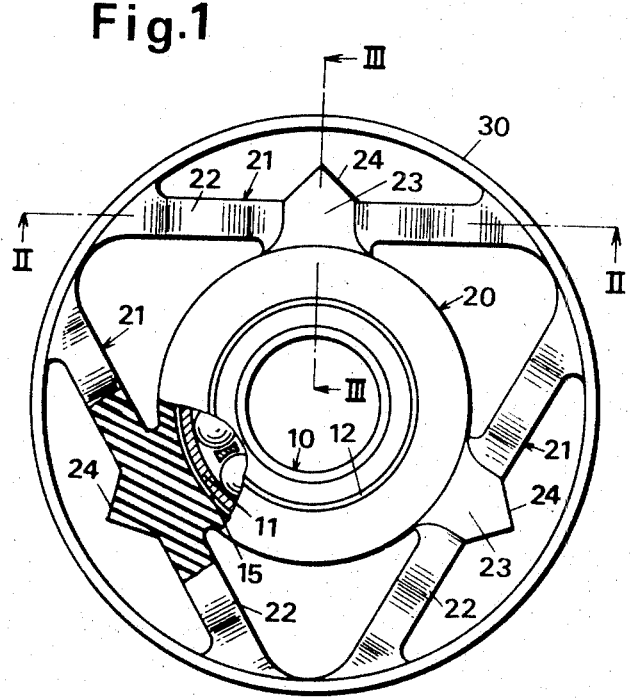
FIG. 1 is a front view of the rotary shaft supporting device comprising one embodiment of this invention, with certain parts thereof being broken away.

This invention will be explained in detail with reference to preferred embodiments thereof shown in the drawing.

Figure 3:
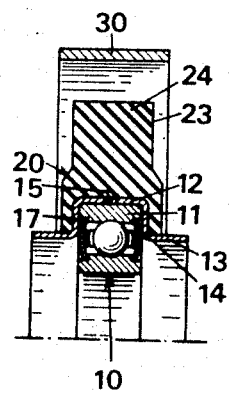
FIG. 3 is a transverse sectional view taken along the line III—III of FIG. 1.

In FIG. 1, an annular dust cover 12 is mounted on a bearing 10 to provide cover to an outer race 11 in intimate contact therewith. In FIG. 3, annular flanges 13 extending leftwardly and rightwardly are formed integrally with the dust cover 12 to be disposed on opposite end portions thereof which are positioned against opposite side surfaces of the outer race 11. As shown in FIG. 3, an annular member 20 made of a resilient material, such as a soft synthetic resinous material, natural rubber, butyl rubber or other synthetic rubber, is disposed on the outer peripheral surface of the dust cover 12. The bearing 10 having the dust cover 12 mounted thereon is received in an annular channel 15 formed on the inner peripheral surface of the annular member 20.

By virtue of the aforementioned construction, the bearing 10 is resiliently supported by the annular member 20. Surfaces 17 of the inner peripheral surface of the annular member 20 abut against bases 14 of the flanges 13 extending leftwardly and rightwardly of the dust cover 12.

Figure 2:
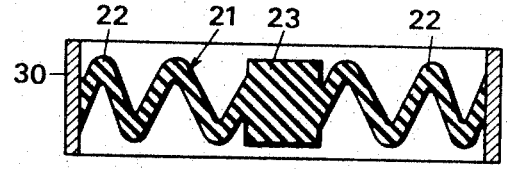
FIG. 2 is a transverse sectional view taken along the line II—II of FIG. 1.

The resilient annular member 20 is formed integrally with three support members 21 made of a resilient material and disposed tangentially of the annular member 20 in three positions disposed equidistantly from one another on the circumference of the annular member 20. Reinforced portions 23 of increased thickness are formed each in a position in which one of the support members 21 is tangentially connected to the annular member 20. Each support member 21 is divided into two equal parts by the reinforced portion 23 formed in its geometrical center and each part is formed in wave form at 22 as shown in FIG. 2, with the ridges of waves being directed axially of the bearing. Each reinforced portion 23 is formed with a stopper 24 of sharp angle projecting radially outwardly. The provision of the waves 22 permits axial displacement of the bearing.

The waves 22 of the support member 21 are arranged such that the waves of the two equal parts of the support member 21 disposed to the left and right of the reinforced portion 23 are arranged asymmetrically. That is, the left part of the support member 21 shown in FIG. 2 extends obliquely downwardly from the reinforced portion 23 to form a furrow and the right part thereof extends obliquely upwardly therefrom to form a ridge, so that the furrows and ridges occurring asymmetrically in the left and right parts of each support member 21.

The resilient support members 21 are connected to an annular housing 30 which in turn is connected to a frame or other fixed member (not shown) of a motor vehicle.

In the rotary shaft supporting device constructed as aforementioned, when the rotary shaft journalled by the bearing shows slight deviation from its center, displacement of the bearing 10 supported by the resilient support members 21 is permitted within the range of flexibility of the waves 22 of the support members 21. If the displacement of the bearing 10 exceeds the range of flexibility of the support members 21, then one part of the support member 21 involved is subjected to a compressive force while the other part thereof is subjected to an expansive force. However, the respective parts of the rest of the support members 21 are subjected to forces which are oppositely directed to the aforementioned forces, so that the supporting device as a whole redresses balance and the bearing 10 is restored to its original position.

In case the rotary shaft is a propeller shaft of a motor vehicle, it will move in vibratory motion back and forth because of oscillation of the rear wheels when the motor vehicle runs. Thus, the bearing 10 will be subjected to both axial displacement and radial displacement at the same time. The rotary shaft supporting device according to this invention is effective to readily restore the bearing 10 to its original position in such case by virtue of the provision of the waves 22 in the resilient support members 21.

Figure 4:
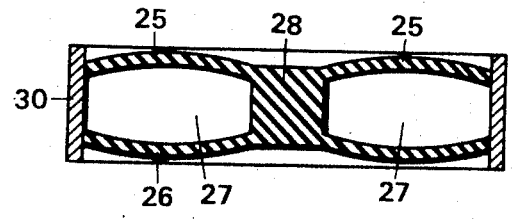
FIG. 4 is a transverse sectional view of another embodiment which corresponds to FIG. 2.

FIG. 4 is a transverse sectional view, corresponding to FIG. 2, of another form of the support members and reinforced portions of the rotary shaft supporting device according to this invention. Each of a plurality of support members made of a soft synthetic resinous material, rubber or other resilient material comprises two strips 25 and 26 arranged in face-to-face relationship axially of the bearing. Each support member is formed with a reinforced portion 28 of increased thickness at which it is connected to the annular member like the support members of FIGS. 1, 2 and 3. Portions of the strips 25 and 26 disposed between the reinforced portion 28 and the housing 30 are outwardly curved in gentle slope to form flexing portions 27 therein. The provision of the flexible portions 27 permits axial displacement of the bearing 10.

From the foregoing description, it will be appreciated that the rotary shaft supporting device according to this invention offers many advantages. The arrangement in which the bearing embracing annular member is connected to the housing by strips or resilient support members extending tangentially of the annular member makes it possible to increase the length of the strips or support members as compared with conventional devices in which the strips extend radially of the bearing embracing annular member. As a result, the rotary shaft supporting device according to this invention can move a greater axial distance than the conventional devices. Combined with the flexibility of resilient waves or portions formed in the strips themselves, an increase in the range of axial movement of the device as a whole makes it possible to more effectively absorb and attenuate axially directed shocks applied to the bearing portion of the rotary shaft.

If the rotary shaft supporting device according to this invention is designed such that the axial movement of the device as a whole is equal in range to the axial movement of the conventional device, it will be possible to reduce the radius of the housing below that of the housing of conventional devices.

The rotary shaft supporting device according to this invention can effectively absorb and attenuate radially directed vibrations and shocks, because the strips or resilient support members are arranged such that they are disposed at right angles to or obliquely of the direction of the impact of a force exerted on the bearing. Besides, the spring constant for supporting the bearing axially thereof can be varied over a wide range by merely changing the hardness, width and thickness of the strips or resilient support members.

When an external force of high magnitude acts radially on the bearing, the stoppers projecting outwardly from the reinforced portions of the strips or resilient support members abut against the inner surface of the housing to preclude excess radial displacement of the bearing and, at the same time, to attenuate the impact of a force by being resiliently brought into engagement with the housing, thereby precluding damage which might otherwise be caused to the bearing portion.

According to this invention, the strips or resilient support members may be each formed in wave form as shown in FIG. 2 so that the waves may impart flexibility to the support members. In the support members of this form, the ridges of waves in two equal parts of each support member divided by the reinforced portion are arranged asymmetrically. Because of this construction, each support member exhibits uniform flexural rigidity in two axial directions when the bearing is subjected to the impact of an axially directed force. Thus, the impact of axially directed force exerted on the bearing can be absorbed and attenuated equally and smoothly in two opposite directions axially of the bearing. If the waves were arranged symmetrically, the flexural rigidity exhibited by the support member when subjected to the impact of an axially directed force acting in one direction would differ from the flexural rigidity exhibited thereby when subjected to the impact of an axially directed force acting in the opposite direction, so that it would be impossible to smoothly perform an impact absorbing operation.

What is claimed is:

1. A rotary shaft supporting device comprising an annular housing, a plurality of resilient support members each arranged to generally follow a chord of one of the arcs obtained by equally dividing said annular housing, a resilient annular member disposed to contact at an outer circumferential surface thereof the geometrical centers of said supporting members, and a rotary shaft supporting bearing mounted on an inner circumference of said resilient annular member, said supporting members being corrugated, the amplitude of said corrugations extending in a direction parallel to the axis of said bearing.

2. The rotary shaft supporting device of claim 1, wherein the amplitudes of said corrugations are disposed asymmetrically on both sides of the geometrical center of each supporting member.

3. The rotary shaft supporting device of claim 2, wherein there are about the same number of individual corrugations on each side of the geometrical center of each supporting member, and the amplitude of the first corrugations on opposite sides of the center extend in different directions.

4. The rotary shaft supporting device of claim 1, wherein said device comprises a center bearing support for an automotive drive shaft.

5. A rotary shaft supporting device comprising an annular housing, a plurality of resilient supporting members each arranged to generally follow a chord of one of the arcs obtained by equally dividing said annular housing, a resilient annular member disposed to contact at its outer circumferential surface the geometrical centers of said resilient support members, and a rotary shaft supporting bearing mounted on the inner circumferential surface of said resilient annular member, wherein each of said resilient support members comprises two strips arranged in face-to-face relationship with spaces therebetween, forming flexing portions of said resilient support members.

6. A rotary shaft supporting member comprising an annular housing, a plurality of resilient supporting members each arranged to generally follow a chord of one of the arcs obtained by equally dividing said annular housing, each supporting member comprising a pair of spaced strips, a resilient annular member disposed to contact at an outer circumferential surface thereof the geometrical centers of said supporting members, and a rotary shaft supporting bearing mounted on an inner circumference of said resilient annular member.

7. A rotary shaft supporting device as defined in claim 6, wherein each of the strips of the pair is cured in a direction opposite to the direction of curvature of the other.

* * * * *